United States Patent
Hwang et al.

(10) Patent No.: US 11,495,364 B2
(45) Date of Patent: Nov. 8, 2022

(54) METHOD FOR DECOMMISSIONING NUCLEAR FACILITIES

(71) Applicant: KOREA HYDRO & NUCLEAR POWER CO., LTD., Gyeongju-si (KR)

(72) Inventors: Seok-Ju Hwang, Daejeon (KR); Ju-Young Yoon, Daejeon (KR); Young Hwan Hwang, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 59 days.

(21) Appl. No.: 17/048,326

(22) PCT Filed: Apr. 17, 2019

(86) PCT No.: PCT/KR2019/004661
§ 371 (c)(1),
(2) Date: Oct. 16, 2020

(87) PCT Pub. No.: WO2019/203578
PCT Pub. Date: Oct. 24, 2019

(65) Prior Publication Data
US 2021/0158983 A1    May 27, 2021

(30) Foreign Application Priority Data
Apr. 19, 2018  (KR) .......................... 10-2018-0045647

(51) Int. Cl.
*G21D 1/00*     (2006.01)
(52) U.S. Cl.
CPC ................................... *G21D 1/003* (2013.01)

(58) Field of Classification Search
CPC ...... G21D 1/003; G21C 11/02; G21C 11/026; G21F 9/30
See application file for complete search history.

(56) References Cited

U.S. PATENT DOCUMENTS 2,716,705 A * 8/1955 Zinn .................... G21C 11/026
376/288
3,755,079 A * 8/1973 Weinstein .............. G21C 13/00
976/DIG. 293
(Continued)

FOREIGN PATENT DOCUMENTS

| JP | 59-023298 | 2/1984 |
| JP | 5923298 | 2/1984 |
| JP | 02-307097 | 12/1990 |

(Continued)

OTHER PUBLICATIONS

EPO, Search Report of EP 19788113.9 dated Jan. 4, 2022.

*Primary Examiner* — Peter M Poon
*Assistant Examiner* — Joshua C Devorkin
(74) *Attorney, Agent, or Firm* — Lex IP Meister, PLLC (57) ABSTRACT

A method of decommissioning a nuclear facility, including: exposing the plurality of upper penetration holes by removing the plurality of sandboxes; enlarging an upper space of the cavity by cutting an upper portion of the biological shield concrete that is disposed between the plurality of upper penetration holes and between the plurality of upper penetration holes and the cavity; and separating the nuclear reactor pressure vessel from the biological shield concrete.

7 Claims, 6 Drawing Sheets

(56) References Cited

U.S. PATENT DOCUMENTS 5,239,564 A * 8/1993 Jacquier .................... G21F 9/30
                                                                                83/930
5,754,612 A * 5/1998 Gou ....................... G21C 1/084
                                                                                376/205

FOREIGN PATENT DOCUMENTS

| JP | 04-158297 | | 6/1992 |
| JP | 04158297 | * | 6/1992 |
| JP | 1993-196797 | | 8/1993 |
| JP | 06-148393 | | 5/1994 |
| JP | 09-127295 | | 5/1997 |
| JP | 2005-083923 | | 3/2005 |
| JP | 2016-114486 | | 6/2016 |
| KR | 10-1103800 | | 1/2012 |

* cited by examiner

METHOD FOR DECOMMISSIONING NUCLEAR FACILITIES

TECHNICAL FIELD

The present disclosure relates to a method for decommissioning a nuclear facility.

BACKGROUND ART

In general, among nuclear facilities used for nuclear power generation, a pressurized light water reactor type of nuclear power plant includes a reactor pressure vessel and a cavity in which the reactor pressure vessel is positioned, and includes biological shield concrete surrounding the reactor pressure vessel.

In decommissioning of a nuclear facility, it is necessary to expand a space above the cavity to secure a working space in order to easily separate the reactor pressure vessel from the biological shield concrete.

DISCLOSURE

Technical Problem

An exemplary embodiment provides a method for decommissioning a nuclear facility that can easily separate a nuclear reactor pressure vessel from biological shield concrete by easily enlarging an upper space of a cavity where the nuclear reactor pressure vessel is located.

Technical Solution

One aspect of the present invention provides a method for decommissioning a nuclear facility that includes a nuclear reactor pressure vessel, a plurality of pipes that are directly connected to the nuclear reactor pressure vessel, biological shield concrete that surrounds the nuclear reactor vessel and the plurality of pipes and includes a cavity where the nuclear reactor pressure vessel is located, a plurality of upper penetration holes overlapping the plurality of pipes, and a plurality of sandboxes that cover the plurality of upper penetration holes. The method includes: exposing the plurality of upper penetration holes by removing the plurality of sandboxes; enlarging an upper space of the cavity by cutting an upper portion of the biological shield concrete that is disposed between the plurality of upper penetration holes and between the plurality of upper penetration holes and the cavity; and separating the nuclear reactor pressure vessel from the biological shield concrete.

The exposing the plurality of upper penetration holes may be carried out by removing a sealant that seals between the plurality of sandboxes and the upper portion of the biological shield concrete, and separating the plurality of sandboxes from the plurality of upper penetration holes.

The plurality of upper penetration holes may be disposed apart from each other in the upper portion of the biological shield concrete, and the enlarging the upper space of the cavity may be carried out by cutting the upper portion of the biological shield concrete along a first cutting line that connects between outer sides of the plurality of upper penetration holes with reference to the cavity and a second cutting line that connects between inner sides of the plurality of upper penetration holes and the cavity.

The plurality of upper penetration holes each may be formed in the shape of a quadrangle, the first cutting line may connect between one vertex of each of the plurality of upper penetration holes, and the second cutting line may connect between the other vertex of each of the plurality of upper penetration holes and the cavity.

The enlarging the upper space of the cavity may be carried out by cutting the upper portion of the biological shield concrete using a wire saw.

The method for decommissioning the nuclear facility may further include cutting the plurality of pipes.

The nuclear reactor pressure vessel may be a pressurized water reactor. In addition, one aspect of the present invention provides a method for decommissioning a nuclear facility that includes a nuclear reactor pressure vessel, a plurality of pipes that are directly connected with the nuclear reactor pressure vessel, a plurality of supporters that protrude in a direction of biological shield concrete from the nuclear reactor pressure vessel, a cavity that surrounds the nuclear reactor pressure vessel and the plurality of pipes and where the nuclear reactor pressure vessel is positioned, the biological shield concrete that includes a plurality of upper penetration holes overlapping the plurality of pipes and the plurality of supporters, and a plurality of sandboxes that cover the plurality of upper penetration holes. The method includes: exposing the plurality of upper penetration holes by removing the plurality of sandboxes; enlarging an upper space of the cavity by cutting an upper portion of the biological shield concrete that is disposed between the plurality of upper penetration holes and between the plurality of upper penetration holes and the cavity; and separating the nuclear reactor pressure vessel from the biological shield concrete.

Advantageous Effects

According to the exemplary embodiment, a method for decommissioning a nuclear facility that can easily separate a nuclear reactor pressure vessel from biological shield concrete by easily enlarging an upper space of a cavity where the nuclear reactor pressure vessel is located can be provided.

MODE FOR INVENTION

Hereinafter, an exemplary embodiment of the present invention will be described in detail with reference to the accompanying drawing so that a person of ordinary skill in the art to which the present invention belongs can easily implement it. The present invention may be implemented in various different forms and is not limited to an exemplary embodiment described herein.

In addition, unless explicitly described to the contrary, the word "comprise" and variations such as "comprises" or "comprising" will be understood to imply the inclusion of stated elements but not the exclusion of any other elements.

Hereinafter, referring to FIG. 1 to FIG. 6, a decommissioning method of a nuclear facility according to an exemplary embodiment will be described.

Hereinafter, a pressurized water reactor (PWR) type of nuclear power plant will be described as an example of a nuclear facility, but this is not restrictive, and the nuclear facility may be a boiling water reactor (BWR) type of nuclear power plant.

The PWR-type nuclear power plant uses light water as a coolant and a moderator, and uses uranium 235 concentrated to about 2% to 4% as nuclear fuel. The PWR-type nuclear power plant may be divided into a facility related to the nuclear reactor system that sends heat generated by nuclear fission within the reactor to a steam generator for heat exchange, and a facility related to a turbine and a generator system which turns the turbine with the steam generated from the steam generator and condenses the steam to water through a condenser and then the water is circulated back to the steam generator. In general, a coolant (light water), which is a heat transfer medium of a nuclear reactor system, is heated to about 320° C. in a nuclear reactor and pressurized to about 153 atmospheres so that it does not boil. The equipment constituting the system includes a pressurizer that adjusts pressure to maintain constant enthalpy, and a coolant pump that circulates the coolant between the reactor and the steam generator. The system in which the steam generated from the steam generator rotates the turbine and generates power from the generator connected to the turbine shaft may be the same as the principle of a general thermal power plant.

Figure 1:
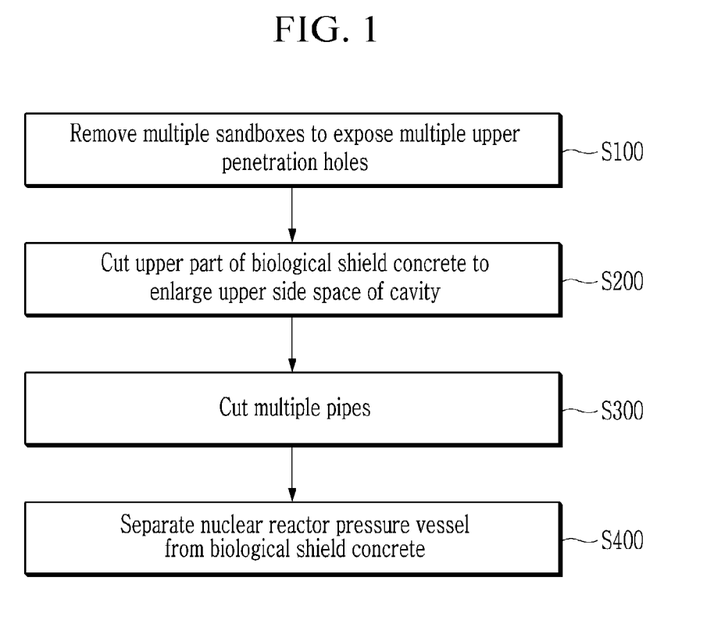
FIG. 1 is a flowchart of a decommission method of a nuclear facility according to an exemplary embodiment.

FIG. 1 is a flowchart of a decommission method of a nuclear facility according to an exemplary embodiment.

FIG. 2 to FIG. 6 are provided for description of the decommission method of the nuclear facility according to the exemplary embodiment.

Figure 2:
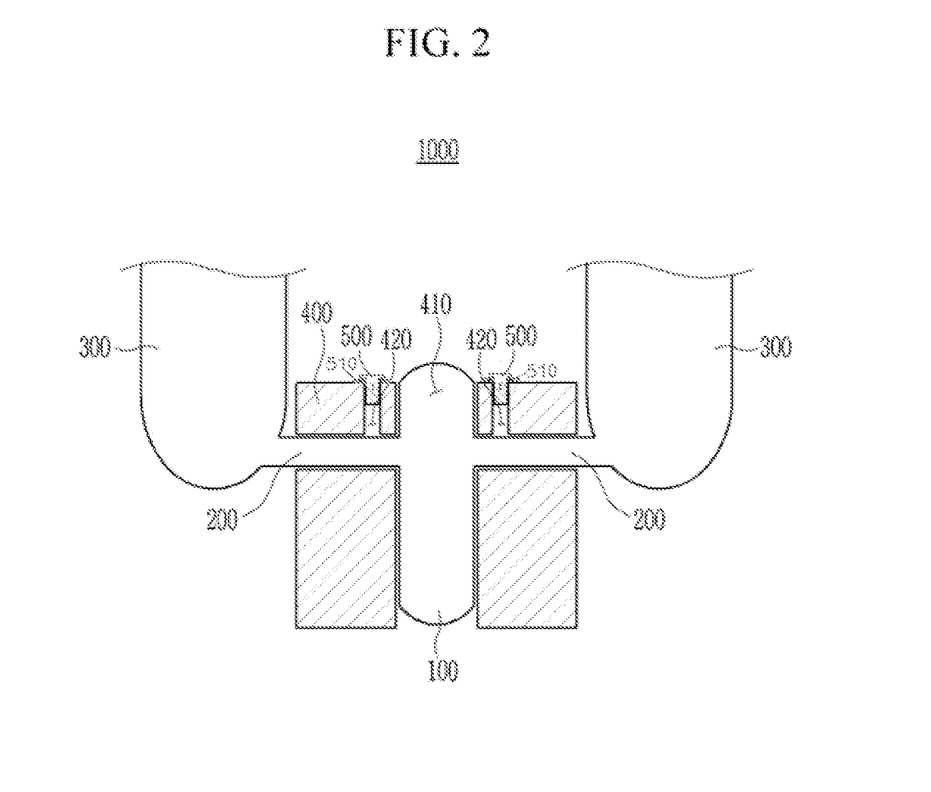
FIG. 2 to FIG. 6 are provided for description of the decommission method of the nuclear facility according to the exemplary embodiment.
Figure 3:
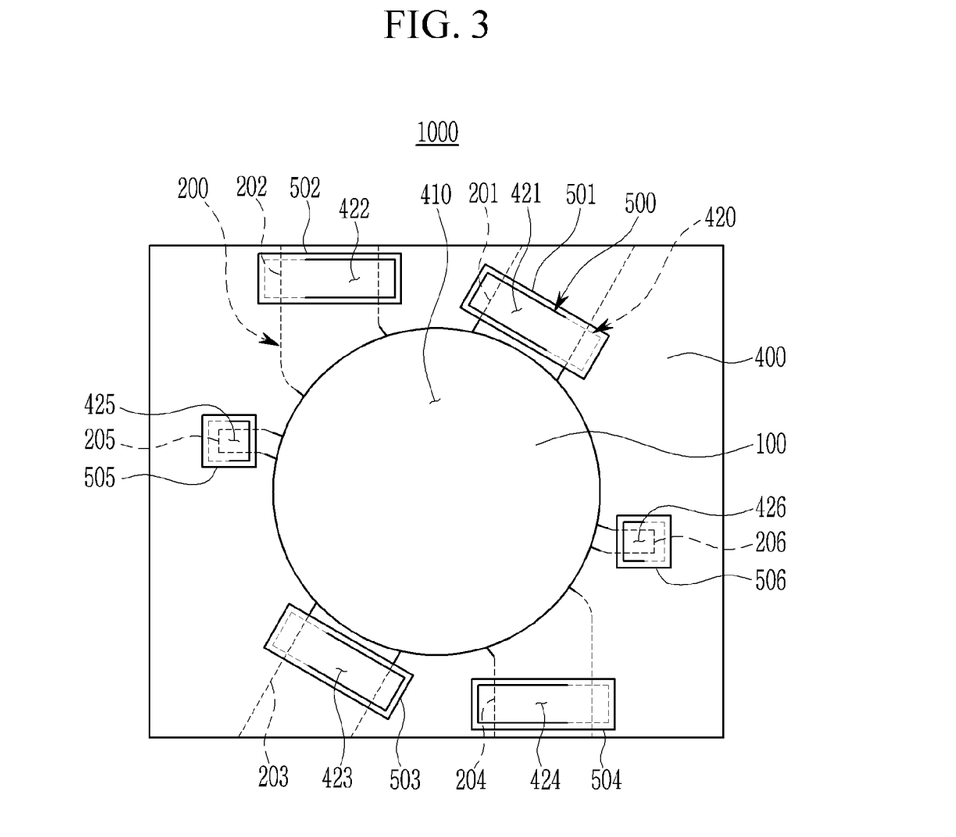

First, referring to FIG. 1 to FIG. 3, a plurality of sandboxes 500 are removed to expose a plurality of upper penetration holes 420 (S100).

FIG. 2 shows a nuclear facility.

Specifically, referring to FIG. 2, a nuclear facility 1000 includes a nuclear reactor pressure vessel 100, a plurality of pipes 200 that are directly connected with the nuclear reactor pressure vessel 100, steam generators 300 that are connected with the nuclear reactor pressure vessel 100 through the pipes 200, biological shield concrete 400 that support the nuclear reactor pressure vessel 100 while surrounding the nuclear reactor pressure vessel 100 and the pipes 200, and a plurality of sandboxes 500.

The nuclear reactor pressure vessel 100 may be a pressurized light-water reactor, but this is not restrictive. For example, the nuclear reactor pressure vessel 100 may be a boiling water reactor.

The nuclear facility 1000 may be formed in various shapes when it includes the nuclear reactor pressure vessel 100, the pipes 200, the biological shield concrete 400, and the sandboxes 500.

The biological shield concrete 400 includes a cavity 410 where the nuclear reactor pressure vessel 100 is located, and a plurality of upper penetration holes 420 that expose the pipes 200 by overlapping the pipes 200.

The upper penetration holes 420 of the biological shield concrete 400 may correspond to welding portions between the pipes 200 and nozzles of the nuclear reactor pressure vessel 100, but this is not restrictive.

The sandboxes 500 cover the upper penetration holes 420. The sandboxes 500 may have a box shape filled with sand, but is not limited thereto.

An upper flange to be supported on an upper portion of the biological shield concrete 400 of the sandboxes 500 may be included, and the upper flange may be supported on the upper portion of the biological shield concrete 400.

The sandboxes 500 are supported on the upper portion of the biological shield concrete 400, and sealants 510 may be provided between the sandboxes 500 and the upper portions of the biological shield concrete 400.

The sandbox 500 may be a structure for easily checking the integrity of the pipe 200 that is directly connected to the nuclear reactor pressure vessel 100.

For example, when the operation of the nuclear facility 1000 is stopped, the sandboxes 500 are separated from the upper penetration holes 420 of the biological shield concrete 400, and the integrity of the pipes 200 exposed by the upper penetration holes 420 can be checked.

The above described nuclear reactor pressure vessel 100, the pipes 200, the steam generator 300, the biological shield concrete 400, and the sandboxes 500 may be disposed in a containment vessel.

FIG. 3 shows the upper portion of the biological shield concrete of the nuclear facility.

Referring to FIG. 3, the nuclear facility 1000 further includes a plurality of supporters that protrude in a direction of the biological shield concrete 400 from the nuclear reactor pressure vessel 100. The supports include a first supporter 205 and a second supporter 206, and the first supporter 205 and the second supporter 206 may protrude from the nuclear reactor pressure vessel 100 and be supported by the biological shield concrete 400. The nuclear reactor pressure vessel 100 may be supported by the biological shield concrete 400 by the first supporter 205 and the second supporter 206. The first supporter 205 and the second supporter 206 may be positioned at the same height as the pipes 200 in a height direction of the biological shield concrete 400.

The pipes 200 connected to the nuclear reactor pressure vessel 100 that is disposed in the cavity 420 of the biological shield concrete 400 include a first pipe 201, a second pipe 202, a third pipe 203, and a fourth pipe 204. The first pipe 201 and the second pipe 202 are connected with one steam generator, and the third pipe 203 and the fourth pipe 204 are connected with another steam generator. Hot water may pass through the first pipe 201 and the third pipe 203, and cold water may pass through the second pipe 202 and the fourth pipe 204, but this is not restrictive.

The upper penetration holes 420 of the biological shield concrete 400 are separated from each other in the upper portion of the biological shield concrete 400. The upper penetration hole 420 has a quadrangular shape on a plane. The upper penetration holes 420 includes a first upper penetration hole 421, a second upper penetration hole 422, a third upper penetration hole 423, a fourth upper penetration hole 424, a fifth upper penetration hole 425, and a sixth upper penetration hole 426.

The first upper penetration hole 421 exposes the first pipe 201 by overlapping the first pipe 201. The second upper penetration hole 422 exposes the second pipe 202 by overlapping the second pipe 202. The third upper penetration hole 423 exposes the third pipe 203 by overlapping the third pipe 203. The fourth upper penetration hole 424 exposes the fourth pipe 204 by overlapping the fourth pipe 204. The fifth upper penetration hole 425 exposes the first supporter 205 by overlapping the first supporter 205. The sixth upper penetration hole 426 exposes the second supporter 206 by overlapping the second supporter 206. The fifth upper penetration hole 425 and the sixth upper penetration hole 426 may have smaller areas than the first upper penetration hole 421, but are not limited thereto.

The first upper penetration hole 421, the second upper penetration hole 422, the third upper penetration hole 423, and the fourth upper penetration hole 424 respectively completely expose the first pipe 201, the second pipe 202, the third pipe 203, and the fourth pipe 204 in width directions of the respective pipes.

The sandboxes 500 are separated from each other in the upper portion of the biological shield concrete 400. The sandbox 500 has a quadrangular shape on a plane. The sandboxes 500 include a first sandbox 501, a second sandbox 502, a third sandbox 503, a fourth sandbox 504, a fifth sandbox 505, and a sixth sandbox 506.

The first sandbox 501 is disposed inside the first upper penetration hole 421 and covers the first upper penetration hole 421. The second sandbox 502 is disposed inside the second upper penetration hole 422 and covers the second upper penetration hole 422. The third sandbox 503 is disposed inside the third upper penetration hole 423 and covers the third upper penetration hole 423. The fourth sandbox 504 is disposed inside the fourth upper penetration hole 424 and overs the fourth upper penetration hole 424. The fifth sandbox 505 is disposed inside the fifth upper penetration hole 425 and covers the fifth upper penetration hole 425. The sixth sandbox 506 is disposed inside the sixth upper penetration hole 426 and covers the sixth upper penetration hole 426. The fifth sandbox 505 and the sixth sandbox 506 may have areas that are smaller than that of the first sandbox 501, but this is not restrictive.

Each of the first sandbox 501, the second sandbox 502, the third sandbox 503, and the fourth sandbox 504 may be a structure for determining integrity of each of the first pipe 201, the second pipe 202, the third pipe 203, and the fourth pipe 204, and the fifth sandbox 505 and the sixth sandbox 506 may be respectively structures for determining integrity of the first supporter 205 and the second supporter 206.

For example, when the operation of the nuclear facility 1000 is stopped, the first sandbox 501, the second sandbox 502, the third sandbox 503, and the fourth sandbox 504 are respectively separated from the first upper penetration hole 421, the second upper penetration hole 422, the third upper penetration hole 423, and the fourth upper penetration hole 424 of the biological shield concrete 400, and integrity of each of the first pipe 201, the second pipe 202, the third pipe 203, and the fourth pipe 204, which are respectively exposed by the first upper penetration hole 421, the second upper penetration hole 422, the third upper penetration hole 423, and the fourth upper penetration hole 424, can be determined.

In addition, when the operation of the nuclear facility 1000 is stopped, the fifth sandbox 505 and the sixth sandbox 506 are respectively separated from the fifth upper penetration hole 425 and the sixth upper penetration hole 426 of the biological shield concrete 400, and integrity of each of the first supporter 205 and the second supporter 206, which are respectively exposed by the fifth upper penetration hole 425 and the sixth upper penetration hole 426, can be determined.

First, for decommissioning of the nuclear facility 1000, the plurality of sandboxes 500, which are the first sandbox 501, the second sandbox 502, the third sandbox 503, the fourth sandbox 504, the fifth sandbox 505, and the sixth sandbox 506, are respectively separated from the plurality of upper penetration holes 420, which are the first upper penetration hole 421, the second upper penetration hole 422, the third upper penetration hole 423, the fourth upper penetration hole 424, the fifth upper penetration hole 425, and the sixth upper penetration hole 426. In this case, the sealant provided between the sandboxes 500 and the biological shield concrete 400 is removed.

Thus, the plurality of upper penetration holes 420, which are the first upper penetration hole 421, the second upper penetration hole 422, the third upper penetration hole 423, the fourth upper penetration hole 424, the fifth upper penetration hole 425, and the sixth upper penetration hole 426, are exposed.

On a plane, the plurality of upper penetration holes 420 are spaced apart from each other in a direction surrounding the cavity 410 and then exposed, and some of the pipes 200 are exposed through the plurality of upper penetration holes 420.

Figure 4:
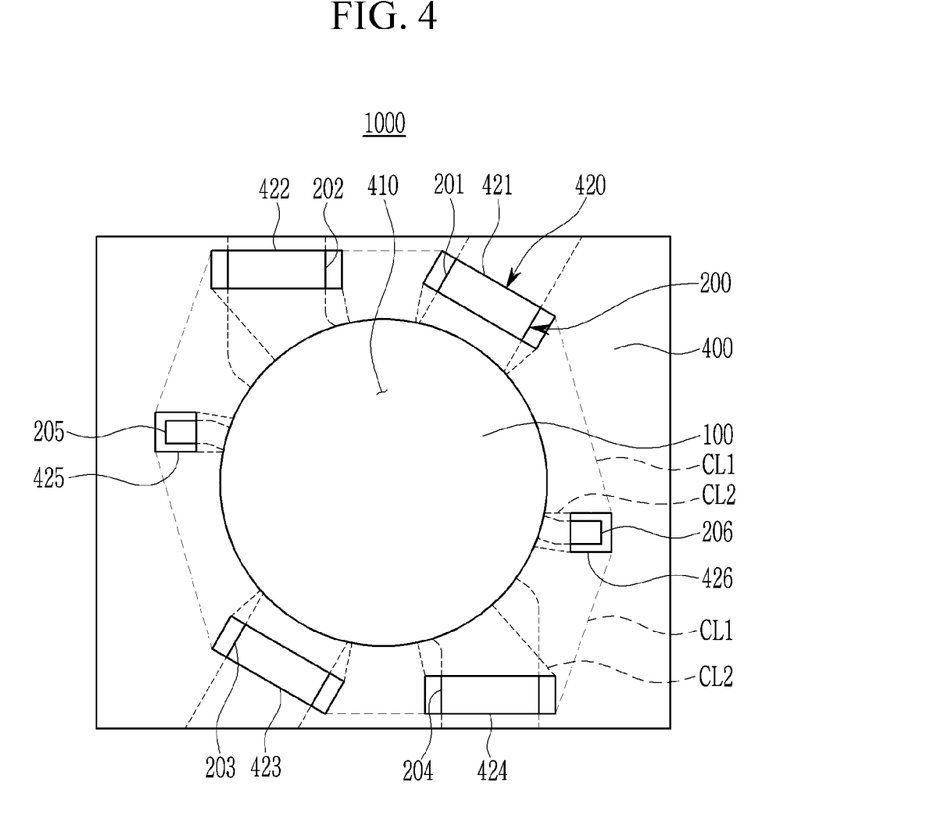
Figure 5:
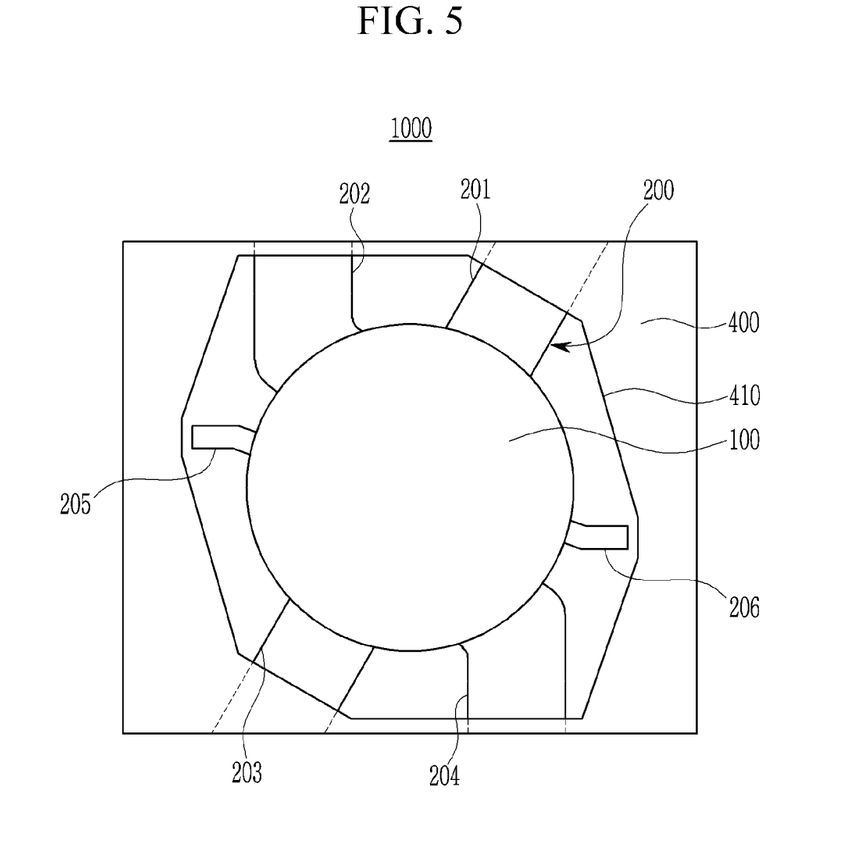

Next, referring to FIG. 4 and FIG. 5, an upper space of the cavity 410 is enlarged by cutting an upper portion of the biological shield concrete 400, which is disposed between the plurality of upper penetration holes 420 and the cavity 410 (S200).

Specifically, the upper portion of the biological shield concrete 400 is cut along a virtual first cutting line CL that connects between outer edges of the plurality of upper penetration holes 420, exposing the pipes 200 with reference to the cavity 410, and a virtual second cutting line CL2 that connects between inner sides of the plurality of upper penetration holes 420 and the cavity 410.

The upper portion of the biological shield concrete 400 may be cut so that the plurality of upper penetration holes 420, each formed in a quadrangular shape, and the circular cavity 410 communicate with each other.

For example, the virtual first cutting line CL1 connects between one vertex of each of the plurality of upper penetration holes 420, and the virtual second cutting lines CL2 connect between the other vertex of each of the plurality of upper penetration holes 420 and the cavity 410.

With reference to the cavity 410, the upper portion of the biological shield concrete 400 is cut along the virtual first cutting lines CL1 that connect between one vertex at the outer side of each of the first upper penetration hole 421, the second upper penetration hole 422, the third upper penetration hole 423, the fourth upper penetration hole 424, the fifth upper penetration hole 425, and the sixth upper penetration hole 426, and the upper portion of the biological shield concrete 400 is cut along the virtual second cutting lines CL2 that connect between the other vertex at an inner side of each of the first upper penetration hole 421, the second upper penetration hole 422, the third upper penetration hole 423, the fourth upper penetration hole 424, the fifth upper penetration hole 425, and the sixth upper penetration hole 426 and the cavity 410.

The cutting of the biological shield concrete 400 may be carried out by using a wire saw, but this is not restrictive, and other cutting means such as a circular saw may be used to cut the biological shield concrete 400.

The biological shield concrete 400 between the cavity 410 and the upper penetration holes 420 is cut along the first cutting line CL1 and the second cutting line CL2, thereby expanding the upper space of the cavity 410.

The pipes 200, the first supporter 205, and the second supporter 206 are exposed through the enlarged upper space of the cavity 410.

Next, the plurality of pipes 200 are cut (S300).

Specifically, the plurality of pipes 200 exposed through the enlarged upper space of the cavity 410 are cut by using a cutting means such as a wire saw and the like. The pipes 200 can be easily cut through the enlarged upper space.

Figure 6:
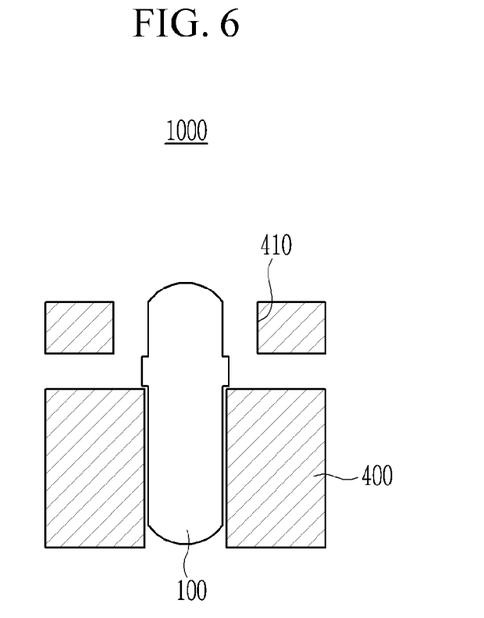

Next, referring to FIG. 6, the nuclear reactor pressure vessel 100 is separated from the biological shield concrete 400 (S400).

Specifically, the nuclear reactor pressure vessel 100 is separated from the biological shield concrete 400 through the enlarged upper space of the cavity 410 of the biological shield concrete 400.

Since the upper space of the cavity 410 where the nuclear reactor pressure vessel 100 is positioned is enlarged, the nuclear reactor pressure vessel 100 can be easily separated from the biological shield concrete 400 without interference from the biological shield concrete 400.

As described, in the method for decommissioning the nuclear facility according to the exemplary embodiment, when the reactor pressure vessel 100 is separated from the biological shield concrete 400, the upper penetration holes 420 are exposed by separating the sandboxes 500, which are provided for determining integrity of the pipes 200, from the upper penetration holes 420 of the biological shield concrete 400 without forming separate holes in the biological shield concrete 400 such that a work space for cutting the biological shield concrete 400 can be assured, thereby easily separating the nuclear reactor pressure vessel 100 from the biological shield concrete 400.

In addition, in the method for decommissioning the nuclear facility according to the exemplary embodiment, the upper space of the cavity 400 of the biological shield concrete 400 can be enlarged by cutting the biological shield concrete 400 between the upper penetration holes 420 that are exposed by separating the sandboxes 500 such that the decommission process time can be shortened by using the sandboxes 500 without performing separate work for decommissioning of the biological shield concrete 400.

That is, a method for decommissioning the nuclear facility that can easily enlarge the upper space of the cavity 410 where the nuclear reactor pressure vessel 100 is positioned by utilizing the sandboxes 500 to thereby easily separate the nuclear reactor pressure vessel 100 from the biological shield concrete 400 is provided.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A method for decommissioning a nuclear facility that includes a nuclear reactor pressure vessel, a plurality of pipes that are directly connected to the nuclear reactor pressure vessel, a biological shield concrete that surrounds the nuclear reactor vessel and the plurality of pipes and includes a cavity where the nuclear reactor pressure vessel is located and a plurality of upper penetration holes arranged around the cavity and overlapping the plurality of pipes, and a plurality of sandboxes that cover the plurality of upper penetration holes, comprising:
   exposing the plurality of upper penetration holes by removing the plurality of sandboxes;
   enlarging an upper space of the cavity by cutting an upper portion of the biological shield concrete that is disposed between the plurality of upper penetration holes and the cavity; and
   separating the nuclear reactor pressure vessel from the biological shield concrete,
   wherein
   the exposing the plurality of upper penetration holes is carried out by removing a sealant that is disposed between the plurality of sandboxes and the upper portion of the biological shield concrete, and separating the plurality of sandboxes from the plurality of upper penetration holes.

2. The method for decommissioning the nuclear facility of claim 1, wherein
   the plurality of upper penetration holes are disposed apart from each other in the upper portion of the biological shield concrete, and
   the enlarging the upper space of the cavity is carried out by cutting the upper portion of the biological shield concrete along a first cutting line that connects between outer sides of the plurality of upper penetration holes with reference to the cavity and a plurality of second cutting lines that connect between inner sides of the plurality of upper penetration holes and the cavity.

3. The method for decommissioning the nuclear facility of claim 2, wherein
   the plurality of upper penetration holes are each formed in a shape of a quadrangle,
   the first cutting line connects between an outer edge of each of the plurality of upper penetration holes with reference to the cavity, and
   the second cutting lines connect between inner vertices of each of the plurality of upper penetration holes and the cavity.

4. The method for decommissioning the nuclear facility of claim 1, wherein the enlarging the upper space of the cavity is carried out by cutting the upper portion of the biological shield concrete using a wire saw.

5. The method for decommissioning the nuclear facility of claim 1, further comprising cutting the plurality of pipes.

6. The method for decommissioning the nuclear facility of claim 1, wherein the nuclear reactor pressure vessel is a pressurized water reactor.

7. A method for decommissioning a nuclear facility that includes a nuclear reactor pressure vessel, a plurality of pipes that are directly connected with the nuclear reactor pressure vessel, a plurality of supporters that protrude in a direction of a biological shield concrete from the nuclear reactor pressure vessel, a cavity that surrounds the nuclear reactor pressure vessel and the plurality of pipes and where the nuclear reactor pressure vessel is positioned, the biological shield concrete that includes a plurality of upper penetration holes arranged around the cavity and overlapping the plurality of pipes and the plurality of supporters, and a plurality of sandboxes that cover the plurality of upper penetration holes, comprising:
   exposing the plurality of upper penetration holes by removing the plurality of sandboxes;
   enlarging an upper space of the cavity by cutting an upper portion of the biological shield concrete that is disposed between the plurality of upper penetration holes and the cavity; and
   separating the nuclear reactor pressure vessel from the biological shield concrete.

* * * * *